(12) United States Patent
Fuller et al.

(10) Patent No.: US 8,682,454 B2
(45) Date of Patent: Mar. 25, 2014

(54) METHOD AND SYSTEM FOR CONTROLLING A MULTIVARIABLE SYSTEM WITH LIMITS

(75) Inventors: James W. Fuller, Amston, CT (US); Richard P. Meisner, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 361 days.

(21) Appl. No.: 13/036,914

(22) Filed: Feb. 28, 2011

(65) Prior Publication Data
US 2012/0221156 A1 Aug. 30, 2012

(51) Int. Cl.
*G05B 13/02* (2006.01)

(52) U.S. Cl.
USPC .................... 700/45; 700/30; 700/31; 700/52

(58) Field of Classification Search
USPC .............................. 700/30, 31, 34, 37, 45, 52
See application file for complete search history.

(56) References Cited

U.S. PATENT DOCUMENTS

| | | | |
|---|---|---|---|
| 3,327,306 A | 6/1967 | Ellert et al. | |
| 5,479,340 A * | 12/1995 | Fox et al. | ........................ 700/33 |
| 6,330,483 B1 | 12/2001 | Dailey | |
| 7,152,023 B2 | 12/2006 | Das | |
| 7,197,147 B2 | 3/2007 | Millott et al. | |
| 7,203,554 B2 | 4/2007 | Fuller | |
| 7,216,071 B2 | 5/2007 | Volponi | |
| 7,328,074 B2 | 2/2008 | Das et al. | |
| 2004/0107013 A1 * | 6/2004 | Fuller et al. | ..................... 700/53 |
| 2006/0282177 A1 | 12/2006 | Fuller et al. | |
| 2009/0281640 A1 | 11/2009 | Fuller | |
| 2009/0281641 A1 | 11/2009 | Fuller | |
| 2010/0010645 A1 | 1/2010 | Fuller | |

OTHER PUBLICATIONS

Volponi A J et al: "The Use of Kalman Filter and Neutral Network Methodologies in Gas Turbine Performance Diagnostics: A Comparative Study", Journal of Engineering for Gas Turbines and Power, vol. 125, No. 4, Oct. 1, 2003, pp. 917-924.
EP Search Report for EP 12157261 dated Jun. 28, 2012.

* cited by examiner

*Primary Examiner* — Sean Shechtman
(74) *Attorney, Agent, or Firm* — O'Shea Getz P.C.

(57) ABSTRACT

A method and system for controlling a multivariable system. The method includes: (a) generating bias data as a function of model error in an on-board model; (b) updating a dynamic inversion algorithm with one or more model terms generated by the on-board model; (c) generating effector equation data by processing reference value data with the updated dynamic inversion algorithm, which effector equation data is indicative of one or more goal equations and one or more limit equations, and which reference value data is indicative of one or more goal values and one or more limit values and is determined as a function of predicted parameter data; (d) at least partially adjusting at least one of the reference value data and predicted parameter data for the model error using the bias data; and (e) generating one or more effector signals by processing the effector equation data with an optimization algorithm.

15 Claims, 4 Drawing Sheets

METHOD AND SYSTEM FOR CONTROLLING A MULTIVARIABLE SYSTEM WITH LIMITS

BACKGROUND OF THE INVENTION

1. Technical Field

The present invention relates generally to multivariable systems and, more particularly, to a system and method that compensates for changes in operating conditions of a multivariable system.

2. Background Information

A gas turbine power system can include a control system, a gas turbine engine having a plurality of engine actuators, and a plurality of engine sensors. The control system controls the engine by generating and providing effector signals to the engine actuators. The term "effector signal" is used herein to describe a command signal that controls operation of the engine through the engine actuators.

The effector signals can be generated by processing goals, limits and a basepoint estimate using a control algorithm such that at least some of the goals are satisfied, subject to each limit being held (i.e., no limit is violated). An example of a goal is to operate the engine at a certain thrust level. An example of a limit (i.e., a maximum or minimum) is to prevent an engine component or system from exceeding a certain temperature. A limit is "active" when its limit value has been met; e.g., when a temperature of a component is, or is predicted to be, at or above a maximum limit temperature. A basepoint estimate is a set of goal and limit values that correspond to an equilibrium point at which each active limit is held and at least some of the goals are satisfied.

During operation, the engine may experience various real-time changes in its system parameters. Changes in the system parameters can result from updated control signals, changes in environmental conditions and changes in operating conditions. Such changes can create discrepancies between engine parameters predicted by the control algorithm and corresponding engine parameters measured by the engine sensors, which in turn can create error in the estimated basepoint.

A typical engine controller can compensate for discrepancies between predicted and measured engine parameters by determining basepoint error and correcting the next basepoint estimate as a function of the basepoint error. The basepoint error can be determined as a function of the goals, inequality limit equations derived from the limits, and equality basepoint equations generated by a basepoint estimator. Determining the basepoint error as a function of the goals, limit equations and basepoint equations, however, can significantly complicate a series of matrix algebra operations performed by the control algorithm. In particular, the control algorithm must perform matrix algebra operations on both (i) the goals and the limit equations to generate the effector signals, and (ii) the basepoint equations to determine basepoint error.

There is a need in the art, therefore, for an control system that can at least partially compensate for engine modeling errors and/or changes in engine operating conditions, while also reducing the amount of matrix algebra operations performed.

SUMMARY OF THE DISCLOSURE

According to a first aspect of the invention, a method is provided for controlling a multivariable system. The method includes the steps of: (a) providing a control system configured with a dynamic inversion algorithm, an optimization algorithm and an on-board model; (b) generating bias data as a function of model error in the on-board model; (c) updating the dynamic inversion algorithm with one or more model terms generated by the on-board model; (d) generating effector equation data by processing reference value data with the updated dynamic inversion algorithm, which effector equation data is indicative of one or more goal equations and one or more limit equations, and which reference value data is indicative of one or more goal values and one or more limit values and is determined as a function of predicted parameter data; (e) at least partially adjusting at least one of the reference value data and the predicted parameter data for the model error using the bias data; and (e) generating one or more effector signals by processing the effector equation data with the optimization algorithm.

According to a second aspect of the invention, a control system for a multivariable system includes an engine modeling device, a dynamic inversion module, a bias estimator and an optimization module. The engine modeling device is configured with an on-board model having one or more model terms that model dynamics of the multivariable system, and is operable to output model term data indicative of one or more of the model terms. The dynamic inversion module is operable to generate effector equation data by processing the model term data as a function of reference value data. The effector equation data is indicative of one or more goal equations and one or more limit equations. The reference value data is indicative of one or more goal values and one or more limit values, and is determined as a function of predicted parameter data. The bias estimator is operable to generate bias data as a function of model error in the on-board model. The bias data at least partially adjusts at least one of the reference value data and the predicted parameter data for the model error. The optimization module is operable to generate one or more effector signals by processing effector equation data with an optimization algorithm.

The foregoing features and the operation of the invention will become more apparent in light of the following description and the accompanying drawings.

DETAILED DESCRIPTION OF THE INVENTION

The present invention includes a system and method for controlling a multivariable system such as a gas turbine engine to compensate for real-time changes in its system parameters.

Changes in the system parameters can create discrepancies between one or more predicted engine parameters and corresponding measured engine parameters, which discrepancies can be referred to as "model error". The present system and method can compensate for such changes by processing one or more goal values derived from respective goals and one or more limit values derived from respective limits along with one or more biases using a control algorithm that includes a dynamic inversion algorithm and a constrained optimization algorithm, which will be described below in further detail. The biases (sometimes referred to as "tuners", disturbances", "estimates" or "model parameters") are numerical values (e.g., −5, 3/16, 8.7, etc.) used within the control algorithm to adjust (e.g., correct) the goal and/or limit values for modeling error due to, for example, changes in engine state, engine efficiency (or inefficiency), wear, or a net effect of these or other signals. The present system and method therefore can significantly reduce the computational complexity of the control algorithm by reducing the quantity of matrix algebra operations that are performed, as compared to an algorithm that must solve basepoint equality equations to determine basepoint error as set forth above. The present system and method, therefore, can (i) quickly response to changes in system parameters and/or (ii) enable inclusion of additional goals and/or limits Referring to FIG. 1, a gas turbine power system 10 is schematically illustrated that includes a high level controller 12 (e.g., a vehicle management system), a control system 14, a gas turbine engine 16 having a plurality of actuators 18, and a plurality of engine sensors 20. The control system 14 is hardwired or wirelessly connected to the high level controller 12, the gas turbine engine 16 via the engine actuators 18, and the engine sensors 20. The engine sensors 20 are disposed with the gas turbine engine 16.

Figure 1:
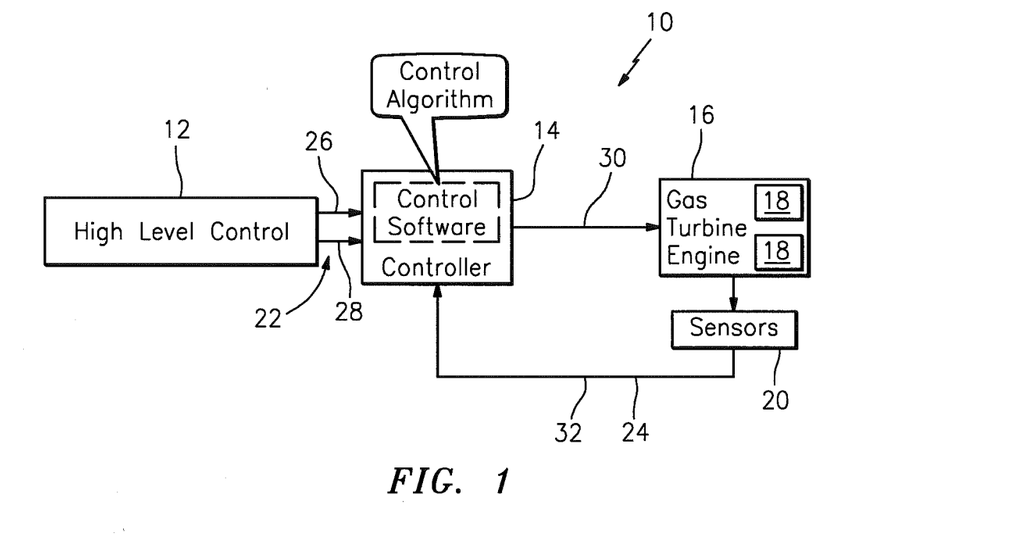
FIG. 1 is a schematic illustration of a gas turbine power system.

The following is a brief overview of the operation of the gas turbine power system 10. The control system 14, which is configured to compensate for changes in system parameters using biases as set forth above, will be described thereafter in further detail.

Figure 2:
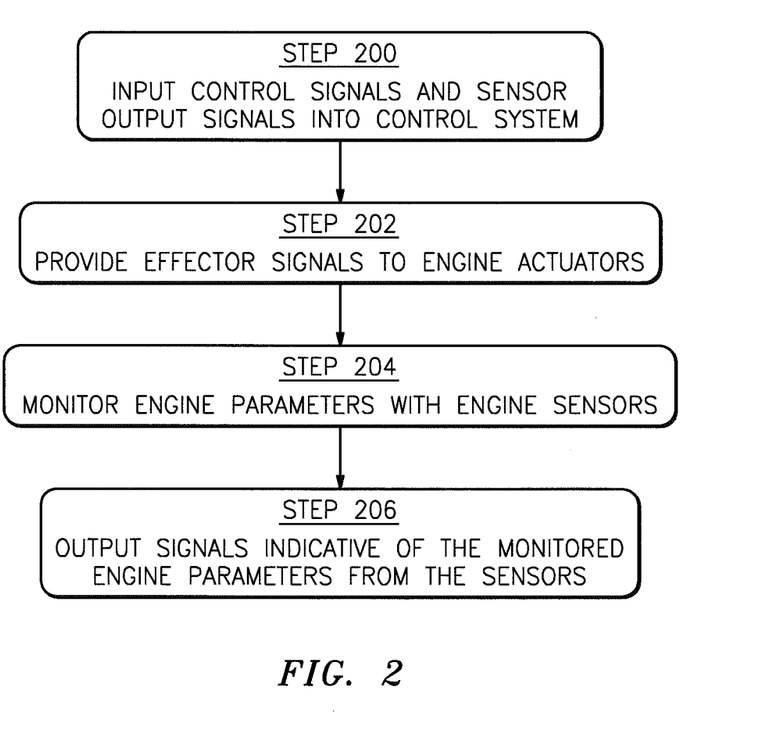
FIG. 2 is a flow diagram that shows a method for operating the gas turbine power system illustrated in FIG. 1.

Referring to FIGS. 1 and 2, the control system 14 inputs one or more control signals 22 from the high level controller 12, and one or more sensor output signals 24 from the engine sensors 20 (see step 200). The control signals 22 can include one or more goals 26 (also referred to as "command signals") and one or more limits 28. A signal indicative of a command to operate the engine at a certain thrust level, as indicated above, is an example of a goal. A signal indicative of a control limit (i.e., a maximum or minimum) to prevent an engine component/system from exceeding a certain temperature, as indicated above, is an example of a limit In step 202, the control system 14 provides one or more effector signals 30 to one or more of the engine actuators 18. The term "effector signal" is used herein, as indicated above, to refer to a command signal that controls operation of an engine actuator. The effector signals 30 are generated, as a function of the control and sensor output signals 22 and 24, to control operation of the engine 16 by controlling the engine actuators 18.

In step 204, the engine sensors 20 monitor certain engine parameters such as temperature, pressure, rotational speeds, etc.

In step 206, the engine sensors 20 output measured parameter data 32 to the control system 14, via the sensor output signals 24 (i.e., feedback signals), indicative of the monitored engine parameters. A signal indicative of temperature, pressure or rotational speed that is measured by an engine sensor is an example of a sensor output signal.

Figure 3:
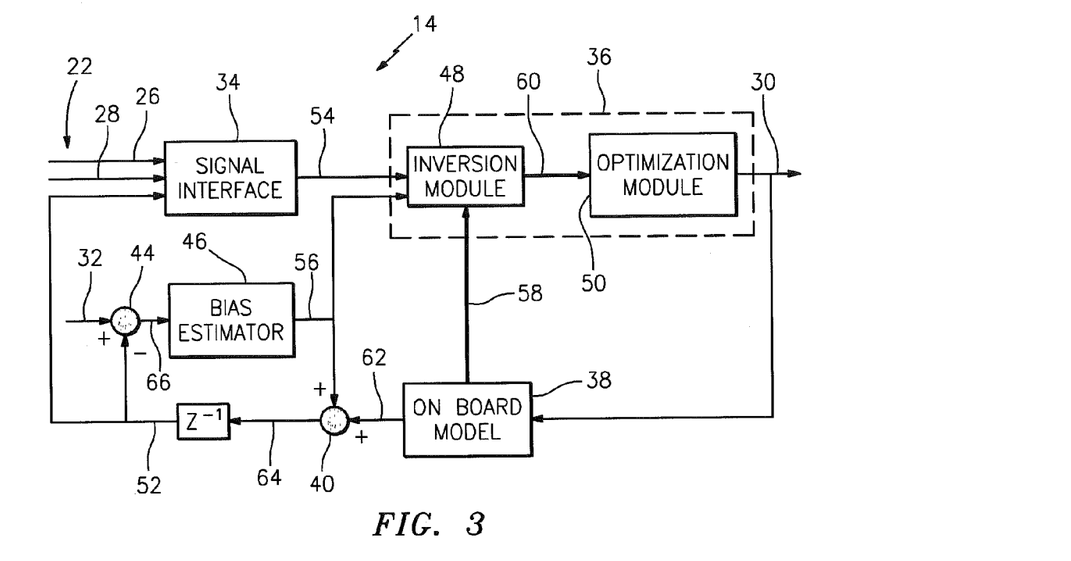
FIG. 3 is a schematic illustration of a first embodiment of a control system included in the gas turbine power system illustrated in FIG. 1.

Referring to FIG. 3, the control system 14 includes a control signal interface 34, an effector signal generator 36, an engine modeling device 38, a prediction signal biasing device 40, a memory storage device 42, a comparator 44 and a bias estimator 46. The effector signal generator 36 includes a dynamic inversion module 48 and an optimization module 50.

The following is a brief overview of interaction between the aforesaid control system components. Each control system component and its associated output and input signals will be described thereafter in further detail.

The control signal interface 34 receives the control signals 22 (i.e., the goals 26 and limits 28) from the high level controller 12 (see FIG. 1), and stored parameter data 52 from the memory storage device 42. The control signal interface 34 provides reference value data 54 to the dynamic inversion module 48. The dynamic inversion module 48 receives bias data 56 from the bias estimator 46 and model term data 58 from the engine modeling device 38. The dynamic inversion module 48 provides effector equation data 60 to the optimization module 50. The optimization module 50 provides one or more effector signals 30 to one or more of the engine actuators 18 (see FIG. 1), and the engine modeling device 38. The engine modeling device 38 provides predicted parameter data 62 to the prediction signal biasing device 40. The prediction signal biasing device 40 receives the bias data 56 from the bias estimator 46, and provides biased predicted parameter data 64 to the memory storage device 42. The predicted parameter data 64 includes predictions of the values of states and variables that have associated goals or limits at the next control process cycle. The comparator 44 receives the stored parameter data 52 from the memory storage device 42, and the measured parameter data 32 from one or more of the engine sensors 20 (see FIG. 1). The stored parameter data 52 includes estimates of the current values of states and variables that have associated goals or limits The comparator 44 provides prediction error data 66 to the bias estimator 46, which processes this data to produce bias estimates 56. The bias estimates correct for model error. The bias estimates include at least one bias which when added to at least one model output 62 corrects the output for model error.

The control signal interface 34 is configured to generate the reference value data 54 by processing the goals 26, the limits 28 and the stored parameter data 52 using a reference model. The reference model is operable to reflect a desired future dynamic response to possibly changing goals and limits. The reference value data 54 is indicative of a desired value of one or more goals and one or more limits, which are determined for a subsequent (e.g., the next) control process cycle (also referred to as a "program cycle" or "update"). A numerical value indicative of a fan speed that corresponds to a certain engine thrust is an example of a goal value. In some embodiments, each goal can also be associated with one or more additional signals such as 1) a reference value of fan speed included in the reference value data 54 indicative of the desired fan speed dynamic response to the goal, 2) a model prediction of actual fan speed included in the predicted parameter data 62, 3) a sensor measurement of actual fan speed included in the measured parameter data 32, and/or 4) a fan speed bias to correct for model errors. A numerical value indicative of a maximum combustor temperature is an example of a limit value. In some embodiments, each limit can also be associated with one or more additional signals such as 1) a reference value of combustion temperature included in the reference value data 54 indicative of the desired combustion temperature dynamic response to the possibly changing limit value, 2) a model prediction of actual combustion temperature included in the predicted parameter data 62, 3) a sensor measurement of actual combustion temperature included in the measured parameter data 32, and/or 4) a combustion temperature bias to correct for model errors.

The reference model generates the reference value data 54 by modeling the desired dynamics of the controlled engine to estimate (i) what each goal value should be in a subsequent control process cycle based on a respective one of the goals 26, and (ii) what each limit value should be in the subsequent control process cycle assuming that a respective one of the limits 28 is active. The reference model therefore translates the goals 26 and limits 28 into goal and limit values that will exhibit a desired response in the subsequent control process cycle. Where one of the goals is to increase engine thrust to a certain command level, for example, the reference model estimates what the thrust would be in the next control process cycle if the thrust follows a desired trajectory from its current value to the command level. A simplified example of such a reference model is as follows:

$$\begin{bmatrix} yref \\ yasy \end{bmatrix}_{n+1} = \hat{y}_n + \min\left\{ \begin{bmatrix} \text{goal rate limit} \\ \text{limit rate limit} \end{bmatrix}, \begin{bmatrix} Bg & 0 \\ 0 & Bc \end{bmatrix} \cdot \left( \begin{bmatrix} Yc \\ Y\max \end{bmatrix}_n - \hat{y} \right)_n \right\}$$ (EQ. 1)

$$Bg = 1 - \exp(-Ts/tg)$$ (EQ. 2)

$$Bc = 1 - \exp(-Ts/tc)$$ (EQ. 3)

where "n" represents a current control process cycle, "yref" represents a vector of goal values on a trajectory from $\hat{y}$ to Yc, "yasy" represents a vector of limit values on an asymptotic approach from $\hat{y}$ to Ymax, "$\hat{y}$" represents a predicted output of the reference model with the bias correction, the "goal rate limit" represent an upper limit rate (e.g., maximum) at which yref transitions from $\hat{y}$ to Yc, the "limit rate limit" represents an upper limit rate (e.g., maximum) at which yasy transitions from $\hat{y}$ Ymax, "Yc" represents a vector of goal values (also referred to as "commands"), "Ymax" represents a vector of maximum values for limited variables (also referred to as "limits"), "Ts" represents a period of time the control system takes to complete one control process cycle, "tg" represents a vector of time constants of the desired command responses, and "tc" represents a vector of asymptotic approach time constants. The present invention, however, is not limited to any particular method of generating the goal and limit reference values.

The dynamic inversion module 48 is configured to generate the effector equation data 60 using the dynamic inversion algorithm. The effector equation data 60 is indicative of one or more equality goal equations and one or more inequality limit equations. The inversion algorithm generates each goal equation for a respective one of the goal values, and each limit equation for a respective one of the limit values. An example of a goal equation is:

$$Kg^* u_n = (yref - y1g - \sigma g)_{n+1}$$ (EQ. 4)

where "Kg" represent a matrix of values indicating how the effector signals influence a vector of goals, "u" represents a vector of effector signal values, "y1g" represents how a goal variable will change before the beginning of the next control process cycle if u=0, and "ag" represents a vector of goal biases. An example of a limit equation is:

$$Kc^* u_n \le (yasy - y1c - \sigma c)_{n+1}$$ (EQ. 5)

where "Kc" represents a matrix of values indicating how the effector signals influence a vector of limits, "y1c" represents how a limit variable will change before the beginning of the next control process cycle if u=0, and "σc" represents a vector of limit biases.

The examples of the goal and limit equations provided above each respectively include goal and limit biases "σg" and "σc". The biases are used within the respective equations to adjust (e.g., correct) the goal or limit values, as set forth above, for modeling error due to changes in engine state, engine efficiency (or inefficiency), wear, or a net effect of these or other signals.

The inversion algorithm generates the goal and limit equations by processing the goal values "yref", the goal reference values "y1g", the limit values "yasy", the asymptotic approach values "y1c", and the goal and limit biases "σg" and "σc" as a function of a plurality of model terms. Each model term is a mathematical equation (e.g., dx/dt=2x, y=5x+8x$^2$, etc.) used to model the dynamics of the engine state, and its effects on a variety of signals associated with the control signals 22. The inversion algorithm generates the effector equation data 60 by "inverting" the engine dynamics by algebraically manipulating the model equations to isolate terms involving the effectors on the left hand side of equations 4 and 5.

The optimization module 50 is configured to generate the effector signals 30 by processing the effector equation data 60 using the constrained optimization algorithm. The optimization algorithm processes the effector equation data 60 by solving the goal equations as closely as possible for the effector signals 30, without violating any limit inequality equations or resulting in unacceptably large or rapid engine actuator responses. Under certain conditions, for example, a degree of freedom can be relaxed in one or more of the goal equations in order to generate effector signals that do not violate the limit equations. A degree of freedom is "relaxed" when the effector signals approximately solve one or more of the goal equations; i.e., where the effector signals are predicted to approximately achieve one or more of the goals. The combination of the reference model 34, inversion algorithm 48, and optimization algorithm 50 can be referred to as "constrained dynamic inversion". When there are no limits or inequality equations, the combination has been referred to as "dynamic inversion" in the technical literature. An example of such a constrained dynamic inversion algorithm is disclosed in U.S. Pat. No. 6,882,889, which is hereby incorporated by reference in its entirety. The present invention, however, is not limited to the aforesaid examples. The optimization algorithm can be based on quasi-quadratic programming as is disclosed in U.S. Patent Application Publication No. 2009/0281640, which is hereby incorporated by reference in its entirety. Additional examples of suitable optimization algorithms include linear programming, quadratic programming, interior point methods and non-linear programming methods.

The engine modeling device 38 is configured to generate the predicted parameter data 62 and the model term data 58 using an on-board model. The on-board model includes a plurality of model terms for modeling various engine components, systems, etc. The model terms are compiled to collectively model the system dynamics of the engine for a wide range of environments and engine states.

The on-board model generates the predicted parameter data 62 by processing the effector signals 30 with the model terms. The on-board model, for example, can model the dynamics of how the engine will respond to the effector signals 30 using the model terms. The on-board model can subsequently predict, from the modeled response, one or more values ("predicted engine parameters") for engine parameters that correspond to the engine parameters monitored by the engine sensors 20 (see FIG. 1). The predicted parameter data 62 is indicative of the one or more predicted engine parameters. The predicted parameter data 62, however, can also be indicative of one or more predicted goal and/or limit values. The following is an example of a simplified mathematical algorithm for calculating the predicted engine parameters:

$$y_{n+1} = y1_{n+1} + K * u_n \quad \text{(EQ. 6)}$$

where "$y_{n+1}$" represents a vector of goals, limits or other sensed variables, "$y1_{n+1}$" represents a vector of predicted engine parameters if the vector of effector signals "$u_n$" equals zero, and "K" represents a matrix of values indicating how the vector of effector signals "$u_n$" influences the vector "$y_{n+1}$". The vector of predicted engine parameters "$y1_{n+1}$" can be computed using a detailed nonlinear simulation, a simplified simulation, or a linear simulation. The matrix "K" can be computed and stored as a constant, stored as a function of the engine state, or computed in real-time.

The on-board model generates the model term data 58 by selecting, for example, one or more of the model terms in the equations used to predict the engine goal and limit parameters to be output.

Suitable examples of empirical and/or physics-based on-board models are disclosed in U.S. Pat. Nos. 7,216,071, 7,277,838, 7,472,100, U.S. patent application Ser. No. 12/552,656, and U.S. patent application Ser. No. 12/475,038, each of which is hereby incorporated by reference in its entirety. The present invention, however, is not limited to the aforesaid examples.

The prediction signal biasing device 40 is configured to generate the biased predicted parameter data 64 using the predicted parameter data 62 and the bias data 56. The biased predicted parameter data 64 is indicative of one or more predicted engine parameters that have been adjusted (e.g., biased or corrected) via the biases. The predicted engine parameters can be adjusted, for example, by adding (or subtracting) the biases to (or from) respective predicted engine parameters. Examples of suitable prediction signal biasing devices include arithmetic processing units (e.g., adders) and arithmetic logic units. The present invention, however, is not limited to the aforesaid examples.

The memory storage device 42 is configured to store the biased predicted parameter data input during a current control process cycle (n), and output biased predicted parameter data that was stored from a previous control process cycle (n-1) as the stored parameter data 52.

The comparator 44 is configured to generate the prediction error data 66 in response to receiving the stored parameter data 52 and the measured parameter data 32. The measured parameter data 32 is indicative of, as indicated above, one or more engine parameters (e.g., temperature, pressure, rotational speeds, etc.) that have been monitored by the engine sensors 20. The prediction error data 66 is generated by determining one or more differences between the stored parameter data 52 and the measured parameter data 32. The comparator 44, for example, may determine the difference between an engine temperature predicted by the on-board model and a respective engine temperature measured by one of the engine sensors 20. An example of a suitable comparator is an arithmetic processing unit (e.g., a subtractor). The comparator can also include one or more filters that emphasize certain frequency ranges of the prediction error.

The bias estimator 46 is configured to generate the bias data 56 as a function of the prediction error data 66, which bias data 56 is indicative of one or more biases. The biases are estimated to at least partially compensate the control system 14 for error in the on-board model and/or changes in the engine state. More particularly, the biases are estimated to increase accuracy of the goal and limit equations generated by the dynamic inversion module 48. The biases are also estimated such that, when they are added to the predicted engine parameters, the net result increases the prediction accuracy of the monitored engine parameters.

The biases can be estimated using, for example, the following equation:

$$\begin{bmatrix} \sigma g \\ \sigma c \end{bmatrix}_{n+1} = \begin{bmatrix} \sigma g \\ \sigma c \end{bmatrix}_n + K(y_{feedback} - \hat{y})_n \quad \text{(EQ. 7)}$$

where "$y_{feedback}$" represents a vector of the measured engine parameters. While the aforesaid equation estimates biases for the goal and limit values, biases can also be estimated for proper adjustment to the state of the on-board model, for the goals 26, for the limits 28, etc. An example of a suitable bias estimator is disclosed in U.S. Patent Application Publication No. 2009/0281641, which is hereby incorporated by reference in its entirety. Other examples of suitable bias estimators include, for example, a Kalman filter, a neural network, optimal estimation, recursive system identification, asymptotic observer, an adaptive logic based on L1 adaptive control theory, etc.

Figure 4A:
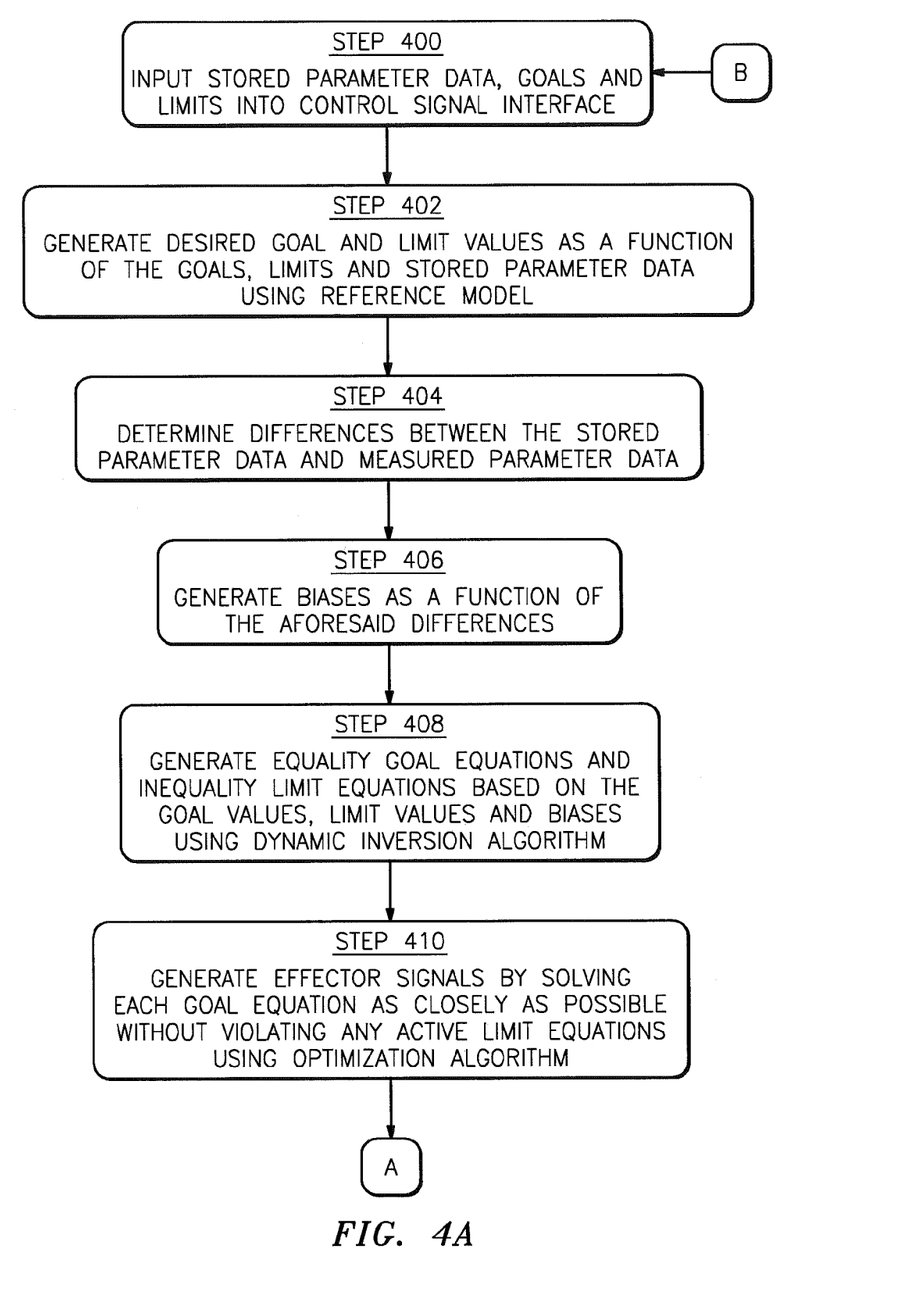
FIGS. 4A and 4B are flow diagrams that collectively show a method for operating the control system illustrated in FIG. 3.
Figure 4B:
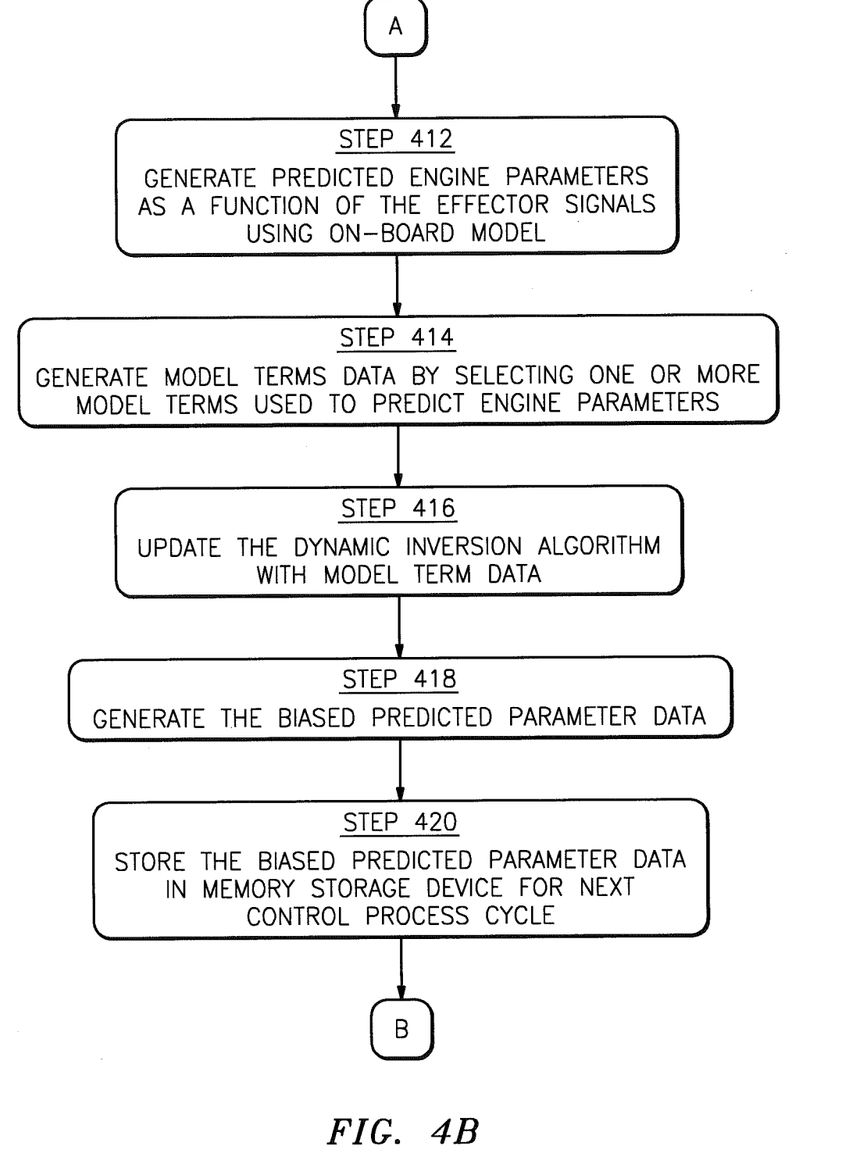

FIGS. 4A and 4B show a flow diagram of operation of the control system 14 during one control process cycle. Referring to FIGS. 3, 4A and 4B, the control signal interface 34 receives goals 26 and limits 28 from the high level controller 12 (see FIG. 1), and stored parameter data 52 from the memory storage device 42 in step 400. One of the goals may be, for example, to increase engine thrust to 80% of a maximum rated thrust output. A corresponding limit may be, for example, to prevent a temperature within an engine combustor from exceeding 85% of a failsafe temperature. The stored parameter data 52 provides estimates of current values for quantities with goal and limits from which the desired goal and limit values for the next controller update can be calculated for each goal 26 and limit 28. The stored parameter data 52 may indicate, for example, that the engine 16 is currently predicted to be operating at a fan speed that corresponds to 60% of the maximum rated thrust output, and that the temperature within the engine combustor is currently predicted to be at 75% of its failsafe temperature.

In step 402, the control signal interface 34 processes the goals 26 and limits 28 as a function of the stored parameter data 52 using the reference model to generate desired goal and limit values for the next controller update. The reference model dictates, for example, how certain engine parameters should change as the thrust is increased from 60% to 80%. If the thrust should increase by less than one percent before the next control process cycle, for example, one of the goal values may be associated with the engine producing 61% thrust.

In step 404, the comparator 44 generates prediction error data 66 indicative of differences between the stored parameter data 52 received from the memory storage device 42, and measured parameter data 32 received from one or more of the engine sensors 20 (see FIG. 1). The prediction error data 66 may indicate, for example, that there is a one half of one percent difference between the predicted 60% thrust and a 59.5% thrust, which corresponds to a fan speed measure by one of the engine sensors 20 (see FIG. 1).

In step 406, the bias estimator 46 generates biases as a function of the prediction error data 66. One of the biases may be generated, for example, to at least partially compensate the control system 14 for the one half of one percent difference between the predicted 60% thrust and the measured 59.5% thrust. The biases, however, can go to constant values when there are no remaining differences between the predicted and measured engine parameters. In such circumstances, the measured system response can match the modeled response in steady state when no limits are active.

In step 408, the dynamic inversion module 48 receives and processes the reference goal and limit values from the control signal interface 34, and a plurality of biases from the bias estimator 46, using the model terms 58. The goal values, the limit values and the biases are processed within the inversion algorithm to generate a plurality of goal equality equations and a plurality of limit inequality equations. The biases are used within the equations to adjust at least one of the goal values and/or at least one of the limit values for modeling error that occurred during the previous control process cycle.

In step 410, the optimization module 50 solves the goal equations as closely as possible for the effector signals 30, without violating any active limit equations or resulting in unacceptably large or rapid engine actuator responses. The goal value of 61% thrust may be reduced to 60.75% thrust, for example, if increasing the thrust above 60.75% would increase the temperature within the engine combustor above 85% of the failsafe temperature and, thus, violate a respective limit equation. The effector signals 30 therefore may be generated to include, for example, a signal to increase a fuel injection flow rate to a level where the engine will operate at 60.75% thrust.

In step 412, the engine modeling device 38 generates predicted parameter data 62 as a function of the effector signals 30 using the model terms of the on-board model. The on-board model may model, for example, how the dynamics of the engine will change as a respective engine actuator 18 (see FIG. 1) responds to the effector signal to increase the aforesaid fuel injection flow rate. The on-board model may predicted, for example, that the engine will operate at 60.5% thrust, rather than the desired 60.75% thrust, where environmental conditions have become unfavorable. One of the predicted engine parameters therefore may be indicative of a fan speed that corresponds to the engine operating at 60.5% thrust.

In step 414, the engine modeling device 38 generates the model term data 58 by selecting model terms used to predict the engine parameters which will be used by the inversion algorithm during the next control process cycle. One of the model terms, for example, can be one that accounts for the unfavorable environmental conditions.

In step 416, the engine modeling device 38 provides the model term data 58 to the dynamic inversion module 48 to update (i.e., replace or modify) one or more of the model terms in the inversion algorithm. Such updates permit the inversion algorithm to at least partially account for changes in the engine state and, therefore, increase the accuracy of the control system 14.

In step 418, the prediction signal biasing device 40 generates the biased predicted parameter data 64 by, for example, adding the bias data 56 to the predicted parameter data 62.

In step 420, the biased predicted parameter data 64 is stored in the memory storage device 42 for the next control process cycle.

When no limits are active, zero offset of measured responses from each goal can be achieved, for example, in three steps. First, the reference values 54 approach the goal and limit values with zero offset. Second, model goal and limit predictions are made to match the measured responses via the biases 56. Third, the effector signal generator 36 generates the model goal predictions to match the goal reference signals 54 via the effector commands. When one or more limits are active, for example, there can be zero offset in retained goals from the respective desired values, and zero offset of the active limits from the respective limit values in steady state. This can be achieved with the aforesaid steps, except that the optimization module 50 will choose to relax some goals (not retain them) or some goal degrees of freedom in favor of making the model active limit predictions match to the active limit reference signals.

Figure 5:
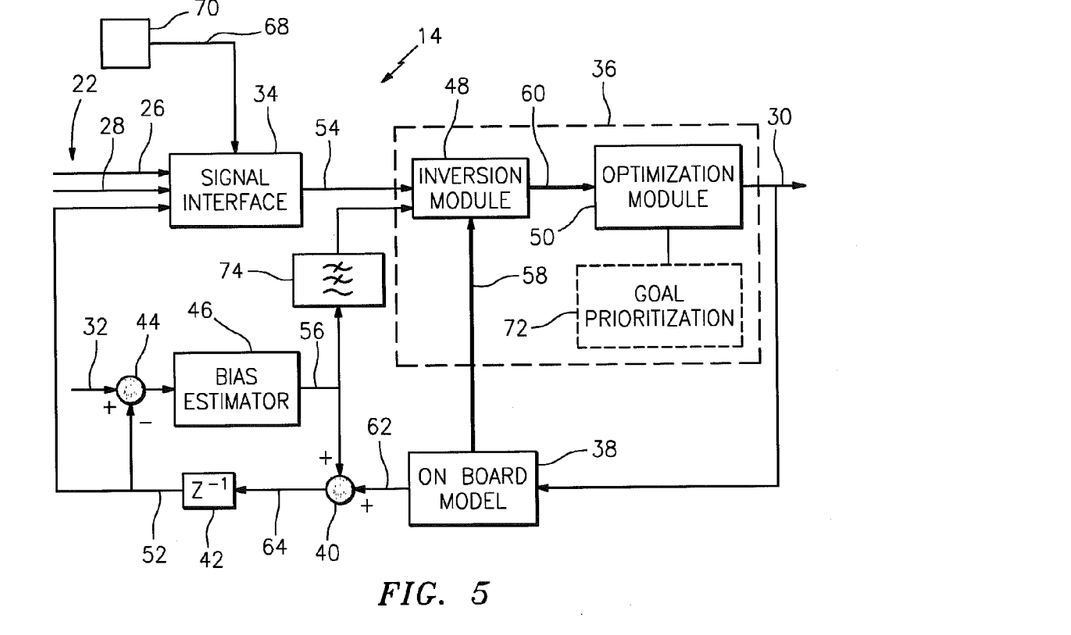
FIG. 5 is a schematic illustration of a second embodiment of a control system included in the gas turbine power system illustrated in FIG. 1.

Referring to now FIG. 5, in some embodiments, the control signal interface 34 can be responsive to one or more internal control signals 68 received from an internal performance command device 70 in addition to the goals 26 and limits 28 received from the high level controller 12 (see FIG. 1). The internal control signals 68 can be indicative of one or more internal system goals. A signal indicative of a command to operate the engine at a certain fuel efficiency level or to increase engine durability is an example of an internal system goal. The control signal interface 34 generates the goal and limit values by processing the internal system goals along with the goals and limits of the control signals using the reference model in the manner as set forth above.

In some embodiments, the optimization algorithm used by the optimization module 50 can embed the goal equations into a performance index equation in order to determine which goals 26 should be satisfied and which goals 26 should be relaxed, such that none of the limit equations are violated. An example of a performance index equation is:

$$PI = \|Kg^* u_n - y\text{ref}_{n+1} + y1 g_{n+1} + \sigma g_{n+1}\|_Q^2 + \|u_n\|_R^2 \qquad (EQ.\ 8)$$

where "PI" represent a performance index, "Q" represents a positive semi-definite goal weighting matrix, and "R" represents a positive definite weighting matrix. Entries within the Q matrix are used to prioritize the goals 26. Higher goal weights within the Q matrix can be indicative of higher priority goals. A zero goal weight within the Q matrix indicates that a respective goal is turned off. Entries within the R matrix are used to prioritize use of the effectors. Lower effector weights within the R matrix can be indicative of higher priority effectors. The weighting matrices "Q" and "R" can be provided by a goal prioritization module 72 having a relative goal prioritization logic. The goal prioritization logic can generate the weighting matrices "Q" and "R" to provide a degree of robustness to model 38 errors.

The performance index equations are solved by the optimization algorithm to obtain values for the effector signals 30 that reduce (e.g., minimizes) the performance indices, without violating the active limit equations or resulting in unacceptably large or rapid engine actuator responses. An example of a suitable optimization algorithm and absolute goal prioritization logic is disclosed in the afore-reference U.S. Publication No. 2009/0281640. The present invention, however, is not limited to the aforesaid example. In alternate embodiments, for example, the goal prioritization module can have a relative goal prioritization logic in which a goal degree of freedom, rather than a particular goal, is relaxed in response to the relative sizes of the entries in the weighting matrix Q.

In some embodiments, the bias estimator 46 can output the bias data 56 at a relatively high bandwidth such that the control system 14 can quickly adapt to compensate for modeling error. Such high bandwidth signals, however, can sometimes over-compensate the effector signals 30 and, thereby, destabilize the gas turbine power system 10 (see FIG. 1). In one embodiment, therefore, the bias estimator 46 can output the bias data 56 within a certain bandwidth to promote system stability; i.e., prevent over-compensation in the effector signals 30. In the embodiment shown in FIG. 5, the bias data 56 can be filtered by a filtering device 74 to reduce its bandwidth before being provided to the dynamic inversion module 48. The filtering device can include a low pass filter designed using L1 adaptive control theory. The bias data 56 provided to the prediction signal biasing device 40 need not be filtered, however, so as to reduce discrepancies between the predicted and measured engine parameters. Alternatively, the bias estimator 46 can include hardware and/or software that can internally decrease the bandwidth of the bias data 56 using known techniques.

Each of the control system components shown in FIGS. 3 and 5 can be implemented, by one skilled in the art, using hardware, software, or a combination thereof. The hardware can include, for example, one or more processors, analog and/or digital circuitry, etc.

Additionally, some or all of the control system components can be combined into a single multifunctional device such as a central control computer.

While various embodiments of the present invention have been disclosed, it will be apparent to those of ordinary skill in the art that many more embodiments and implementations are possible within the scope of the invention. The control system, for example, can be used to control other types of multivariable systems besides gas turbine power systems. Some examples of other types of multivariable system with limits include aircraft flight control systems, building heating, ventilation, and air conditioning (HVAC) systems, windmills, other electric generation systems, chemical plants, etc. Accordingly, the present invention is not to be restricted except in light of the attached claims and their equivalents.

What is claimed is:

1. A method for controlling a multivariable system that includes a gas turbine engine, the method comprising:
   measuring one or more engine parameters using one or more engine sensors;
   providing a control system configured with a dynamic inversion algorithm, an optimization algorithm and an on-board model;
   respectively comparing one or more biased predicted engine parameters from a previous control process cycle to the one or more measured engine parameters to determine model error in the on-board model;
   generating bias data as a function of model error in the on-board model;
   updating the dynamic inversion algorithm with one or more model terms generated by the on-board model;
   generating effector equation data by processing reference value data with the updated dynamic inversion algorithm, which effector equation data is indicative of one or more goal equations and one or more limit equations, and which reference value data is indicative of one or more goal values and one or more limit values and is determined as a function of predicted parameter data;
   at least partially adjusting at least one of the reference value data and/or predicted parameter data for the model error using the bias data;
   generating one or more effector signals by processing the effector equation data with the optimization algorithm; and
   controlling operation of the gas turbine engine by providing the one or more effector signals to corresponding engine actuators.

2. The method of claim 1, wherein the bias data is indicative of one or more bias values.

3. The method of claim 1, wherein the effector signals are generated by at least approximately solving the goal equations with the optimization algorithm, while holding each limit equation.

4. The method of claim 3, wherein the optimization algorithm is responsive to an absolute goal prioritization logic used to determine which goal equations to relax such that the limit equations are held.

5. The method of claim 1, further comprising determining the goal and limit values for a future control process cycle using a reference model in response to receiving one or more goals and one or more limits from a high level controller, which reference model reflects future response dynamics of the multivariable system.

6. The method of claim 5, wherein the one or more goal values and the one or more limit values are generated further as a function of predicted parameter data generated during a previous control process cycle, which predicted parameter data is indicative of one or more multivariable system parameters.

7. The method of claim 6, further comprising:
   predicting one or more multivariable system parameters using the on-board model as a function of the one or more effector signals;
   adjusting at least one of the one or more biased predicted engine parameters using the bias data to provide biased predicted parameter data;
   storing the adjusted predicted parameter data in a memory storage device; and
   outputting the predicted parameter data that was generated during the previous control process cycle from the memory storage device.

8. The method of claim 5, wherein the one or more goal values and the one or more limit values are generated further as a function of one or more internal system goals.

9. The method of claim 1, further comprising:
   filtering the bias data to provide filtered bias data;
   wherein the effector equation data is generated using the filtered bias data.

10. A control system for a multivariable system, comprising:
    an engine modeling device configured with an on-board model having one or more model terms that model dynamics of the multivariable system, which engine modeling device is operable to output model term data indicative of one or more of the model terms, and which engine modeling device is operable to generate predicted parameter data with the on-board model, which predicted parameter data is indicative of one or more multivariable system parameters;
    a dynamic inversion module operable to generate effector equation data by processing the model term data as a function of reference value data, which effector equation data is indicative of one or more goal equations and one or more limit equations, and which reference value data is indicative of one or more goal values and one or more limit values and is determined as a function of predicted parameter data;
    a comparator operable to determine model error in the on-board model by comparing biased predicted parameter data output from a memory storage device to corresponding measured engine parameter data, which biased predicted parameter data is indicative of a previous control process cycle;
    a bias estimator operable to generate bias data as a function of the model error in the on-board model, which bias data at least partially adjusts at least one of the reference value data and/or the predicted parameter data for the model error; and an optimization module operable to generate one or more effector signals by processing effector equation data with an optimization algorithm;

wherein at least one component of the control system is implemented using hardware.

11. The system of claim 10, further comprising:

a prediction signal biasing device operable to adjust the predicted parameter data using the bias data to provide the biased predicted parameter data; and a memory storage device operable to store the biased predicted parameter data, and to output biased predicted parameter data that was stored during a previous control process cycle.

12. The system of claim 10, further comprising one or more sensors adapted to generate the measured engine parameter data.

13. The system of claim 10, further comprising a control signal interface adapted to generate the one or more goal values and the one or more limit values by modeling future response dynamics of the multivariable system to changing goals and limits for a future control process cycle as a function of one or more goals and one or more limits received from a high level controller, and predicted parameter data that was generated by the on-board model during a previous control process cycle.

14. The system of claim 10, wherein the optimization algorithm is operable to generate the one or more effector signals by solving the goal equations with the optimization algorithm, while holding each limit equation.

15. The system of claim 10, further comprising a filtering device operable to filter the bias data used to generate the effector equation data.

\* \* \* \* \*